Dec. 27, 1932.    H. O. G. SCHILLING    1,892,475
TUBE CLOSING MACHINE
Filed April 26, 1930    2 Sheets-Sheet 1

Inventor:
H.O.G. Schilling
By
Attorneys

Dec. 27, 1932.  H. O. G. SCHILLING  1,892,475
TUBE CLOSING MACHINE
Filed April 26, 1930   2 Sheets-Sheet 2
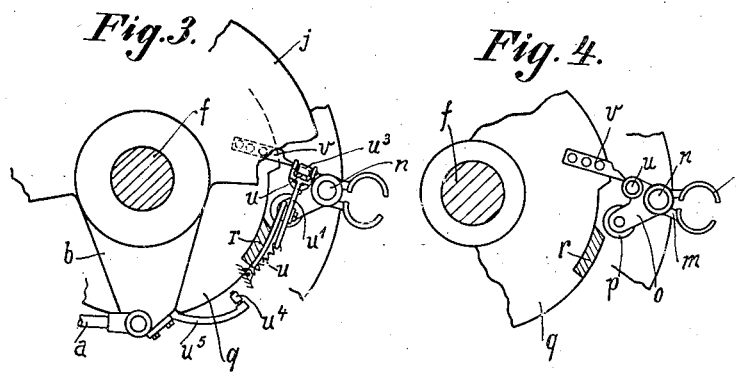
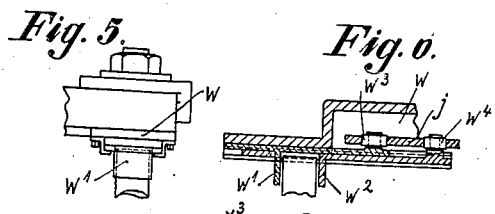
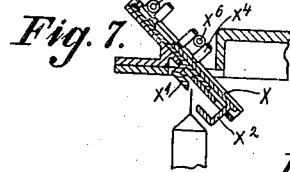
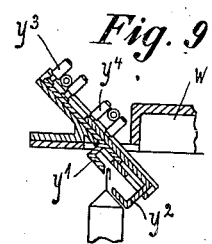
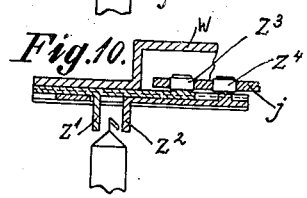
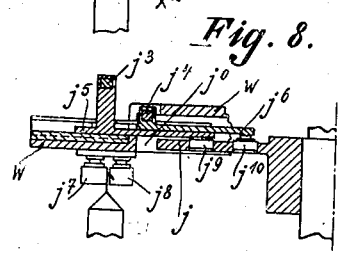
Inventor:
H.O.G. Schilling Patented Dec. 27, 1932

1,892,475

UNITED STATES PATENT OFFICE

HUGO OTTO GEORG SCHILLING, OF HAMBURG, GERMANY, ASSIGNOR OF ONE-HALF TO ALFRED GUSTAV PÜHL, OF HAMBURG, GERMANY

TUBE-CLOSING MACHINE

Application filed April 26, 1930, Serial No. 447,754, and in Germany April 29, 1929.

The present invention has for its object to provide a machine for closing collapsible tubes, which operates more rapidly than machines heretofore known, in which the pawl and ratchet mechanism for feeding the tubes sustained by a common carrier and for moving the closing mechanism so operated that in one feeding movement the tubes were advanced and in the following feeding movement the closing mechanisms were set in operation. In the present tube-closing machine in which also the tubes are sustained by a common carrier and in which also a pawl and ratchet mechanism is used to set the several closing mechanisms in operation, the arrangement is such that the pawl and ratchet mechanism for conveying the tubes is connected with a member for moving the closing mechanisms so devised that on the retreat or reverse movement of the pawl the closing mechanisms are set in operation, so that an advance movement is imparted to the tubes with each movement of the ratchet wheel.

The member for moving the closing mechanisms comprises a disk carrying the pawl which actuates the ratchet wheel, the said disk being formed with slots by which on rotation of the disk movement is transmitted to the closing mechanism, parts extending concentrically from said slots in order to avoid transmission of movement during the advance of the tubes. The tube holders are constructed after the fashion of pincers of which one leg is fixed to the common carrier and the other is pivotally mounted thereon, a stationary disk arranged at the level of the pivoted leg being stepped at its edge in such wise that the pivoted legs each having an extension bearing on the stepped edge on passing the closing mechanisms engage a concentric part of greater radius which acts to hold the pincers closed. A gap on the disk permits re-opening of the pincers passing the same in order to allow the closed tube to fall out. A second concentric part of smaller radius permits opening of the pincers to a slight extent to permit introduction of new freshly filled tubes.

Adjacent to the said gap there is fitted to the stationary disk an arm engaging a pin of the pivoted pincer leg of which the extension is presented at the moment to the gap. This arm ensures that the pincer leg shall be pressed into the gap so that the pincers are opened. For re-closing the pincers there is pivotally mounted on a part of the stationary machine frame a spring-loaded lever which is normally held under the action of its spring in such a position that it is not in contact with any part of the pincers while an arm pivoted to the moving member engages the spring-loaded lever on its retreating movement and swings it so that the lever acts from behind against the said extension of the pivoted pincer leg and thus closes the pincers after the tube is dropped. Now the pivoted leg is brought with its extension into such a position that the extension bears against the said concentric part of the stationary disk of less radius whereby the pincers are held slightly open to permit introduction of a new tube.

Fig. 1 of the accompanying drawings is a side elevation, partly in section of a machine embodying the invention.

Fig. 3 is a plan view showing in detail the disk and the tube holding and opening device.

Fig. 4 is a plan view showing in detail the arrangement of the tube holders,

Figs. 5, 6, 7, 8, 9 and 10 are views partly in vertical section indicating different steps in the operation of closing the end of a collapsible tube by means of the closing mechanism of the machine.

Figure 1:
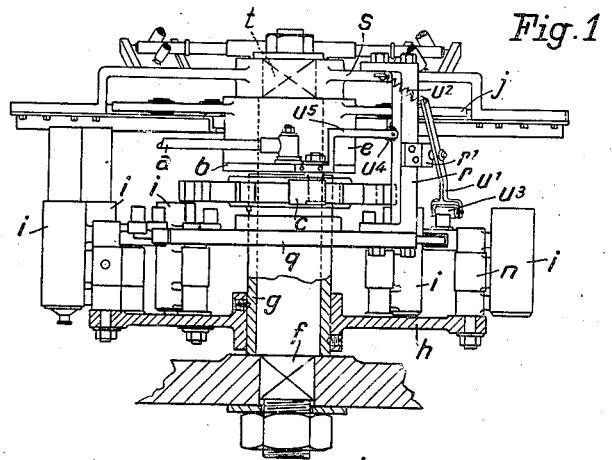

The pawl and ratchet mechanism for actuating the mechanisms set in operation by a reciprocating rod $a$ comprises an oscillatory arm $b$ on which is mounted a pawl $c$ engageable with the teeth of the ratchet wheel $d$. The ratchet wheel is fixed on a sleeve $g$ surrounding a stationary post $f$ while the arm $b$ the boss $e$ of which is pivoted on the post $f$ and is connected by this boss with the actuating disk $j$ for the mechanisms is caused to vibrate in the reciprocating movement of the rod $a$ and imparts uni-directional stepwise rotation to the ratchet wheel $d$ while oscillating the disk $j$. On the sleeve $g$ is mounted a disk $h$ supporting the tube holders $i$ formed after the fashion of pincers. One half of each tube holder, that is, one leg $k$ of the pincers is fixed on the disk $h$ while the other leg $m$ is pivotally mounted on a pin $n$ on the disk $h$. The pivoted leg has an extension $o$ and preferably carries a roller $p$ in the horizontal plane of which is a stationary disk $q$. The disk $q$ is mounted on the machine frame or a sub-frame fixed to the machine frame and consisting of a bracket $r$ and a multi-arm structure $s$ fixed on a polygonal portion of the post $f$. The disk $q$ has a portion $q'$ concentric with the post $f$ and of large radius and a portion $q^2$ also concentric with the post $f$ and of less radius preferably concyclic with the outer face of the bracket $r$. In the direction beyond the bracket $r$ the disk $q$ presents a gap $q^3$.

During the rotation of the disk $h$ the tubes to be closed are introduced into the pincers $k$, $m$ at the time at which the roller $p$ is running on the concentric portion $q^2$ of the disk $q$ whereby the pincers are opened sufficiently wide to permit convenient insertion of the tube. The legs $k$ and $m$ of the pincers are now closed when the roller $p$ runs on the high portion $q'$ of the disk $q$. In the further rotation of the disk $h$ the tubes which are now firmly held are led past the closing mechanisms. As soon as the closure of a tube is completed the extension $o$ of the pincer leg $m$ comes opposite the gap $q^3$ of the disk $q$ at which moment the pin $u$ mounted on the extension $o$ of the pivoted leg is retained by an arm $v$ attached to the stationary disk $q$ whereby the pincers are opened as shown at the right-hand in Figs. 2, 3 and 4, this being rendered possible by reason that the roller $p$ can enter the gap $q^3$. The opening of the pincers permits the tube held thereby and now fully closed to drop out. An arm $r'$ on the bracket $r$ carries a pivot for a lever $u'$ which at one end is engaged by a spring $u^2$ in such wise that it is normally held in an inclined position such that the pin $u$ can move beneath the free end of the lever $u'$, which lever preferably carries a roller $u^3$. A tongue $u^5$ mounted on the arm $b$ and preferably carrying a roller $u^4$ abuts on retraction of the arm $b$ against the upper arm of the lever $u'$ in such wise that the roller $u^3$ engages the pin $u$ located in its path and moves it in the direction of rotation of the supporting disk $h$. This takes place at the moment at which the pin $u$ is released by the arm $v$ and the tube is permitted to drop. Under the action of the lever $u'$ the pincers are again closed and in the further advance of the disk the relative roller $p$ can run on the concentric portion $q^2$ of small radius of the disk $q$.

The closing of the tubes is effected in four stages of operation. A tube which has been freshly engaged by a pair of pincers (Fig. 1 below) is retained by the pincers which are then closed (Fig. 2 to the left) by reason that the roller $p$ has run on to the high edge $q'$ of the disk $q$, whereupon the tube passes to the mechanism shown in Figs. 5 and 6. This mechanism consists of two slides carrying radially guided jaws $w'$ and $w^2$ and having rollers $w^3$ and $w^4$ which engage cam slots $j'$ and $j^2$ in the disk $j$. When tension is exercised on the rod $a$, it moves together with the arm $b$ to the left and the pawl $c$ entrains a tooth of the ratchet wheel $d$ and causes the lefthand pincers to pass under the action of the mechanism $w$ while the pincers, the tube carried by which has been acted on by the mechanism $w$, passes under the second mechanism $x$. During this advance movement no action of the said mechanism $w$ takes place as only the concentric portions of the cam slots $j'$ and $j^2$ leave the rollers $w^3$, $w^4$, uninfluenced. Also in the initial retreating movement or retraction of the rod $a$, when the pawl $c^3$ slips idly over the following tooth, the mechanism $w$ remains inoperative. The ends of the slots $j'$ and $j^2$ are however directed at an inclination so that they converge and in the last part of the retraction of the rod $a$ the jaws $w'$ and $w^2$ of the said mechanism are moved toward one another and thus clamp together the end of the tube which is on top for the time being, so that the tube assumes the form shown in Fig. 7.

When the disk $j$ has been turned so far that the inclined parts engage with their ends the rollers $w^3$ and $w^4$, the rod $a$ has been so far retracted that the pawl $c$ has passed behind the succeeding tooth and in the following advance movement of the rod $a$ the jaws $w'$ and $w^2$ are again opened and at the same time there is effected further rotation of the disk $h$ until the pincers pass from one closing mechanism to the next while a new tube comes within the range of the mechanism $w$ it being understood that in the last part of the movement the concentric portions of the slots $j'$, $j^2$ leave said closing mechanism uninfluenced.

The tube shown in Fig. 7 which, as stated, is pressed together at its ends is now operated on by the closing mechanism $x$ consisting of two slides guided at an inclination and provided with suitable tongues $x'$ and $x^2$ which carry pairs of rollers $x^3$, $x^4$ branching therefrom at right angles. Between the pair of rollers $x^3$ is interposed a roller $x^5$ and between the rollers $x^4$ is a roller $x^6$. The rollers $x^5$, $x^6$ are mounted on the ends of rods $j^3$, $j^4$ which are carried by slides $j^5$ and $j^6$, Figs. 2 and 8, which form parts of the closing mechanism $j^0$, and also rollers $j^9$ and $j^{10}$ which engage slots $j^{11}$ and $j^{12}$ of the disk formed similarly to the slots $j'$ and $j^2$. The rods $j^4$ and $j^3$ are held at the center by the slides $j^5$ and $j^6$ and at their opposite ends the said rods also carry rollers $y^5$ and $y^6$ which engage between pairs of rollers $y^3$ and $y^4$ and are carried by slides also guided at an inclination and provided with projections $y'$ and $y^2$.

The operation of the three closing mechanisms $x$, $j^0$ and $y$ is as follows:—

After the tube, as shown in Fig. 7, has passed to the closing mechanism $x$, as the slides $j^5$ and $j^6$ approach one another the tongues $x'$ and $x^2$ under the action of the slots $j^{11}$ and $j^{12}$ so that the outermost extremity of the compressed end portion of the tube is folded over and the form shown in Fig. 7 is converted into that shown in Fig. 8. In the next following operation by the closing mechanism $j^0$ consisting of the rollers $j^7$ and $j^8$ the folded over outer end is pressed flat, and in the next following operation the tongues $y'$ and $y^2$ (Fig. 9), which form the closing mechanism $y$, are pressed towards one another. Thereby the half-closed end is again folded over, so that the tube passes from the form shown in Fig. 9 into that shown in Fig. 10.

The closing mechanism $z$ last to come into operation is constructed similarly to the closing mechanism $w$ and comprises slides carrying clamping jaws $z'$ and $z^2$ and provided with rollers $z^3$ and $z^4$ which engage slots $j^{13}$ and $j^{14}$ in the disk $j$. The operation is such that the folding over of the compressed end of the tube is completed.

Figure 2:
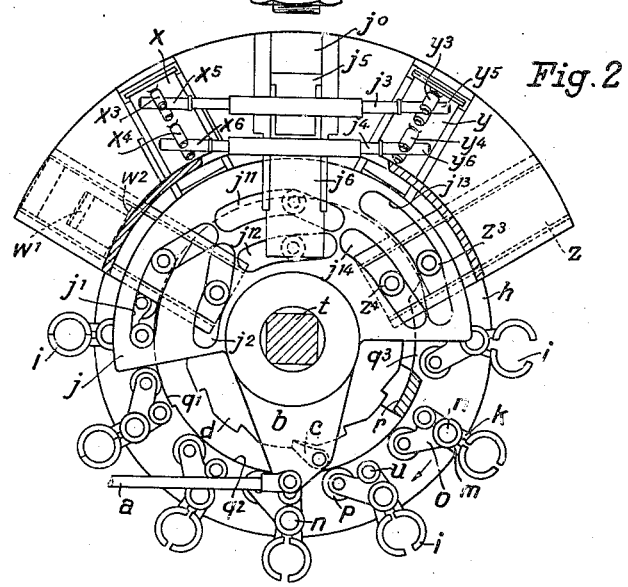
Fig. 2 is a plan view.

In the next stage there is effected release of the tube by the pincers which is now opened as shown at the right in Fig. 2.

I claim:—

1. In a tube closing machine the combination comprising a plurality of closing mechanisms, a common tube carrier adapted to move intermittently, tube holders supported by said carrier and adapted to be automatically closed and opened, a pawl and ratchet mechanism effecting the advance movement of said tube carrier, a member controlling the movements of said closing mechanisms, said controlling member being coupled with said pawl and ratchet mechanism for operating said closing mechanisms upon the retreating movement of said pawl.

2. A tube closing machine according to claim 1, in which the member for moving the closing mechanisms consists of a disk carrying the pawl and provided with slots, parts of the walls of the slots forming cams to transmit movement to the closing mechanisms on rotation of the disk, and other parts of the walls of the slots being concentric with the disk to avoid transmission of movement during the advance of the tubes.

3. A tube closing machine according to claim 1, comprising tube holders formed after the fashion of pincers with two limbs, one limb being fixed to the common carrier and the other limb pivoted thereto, a stepped disk disposed in a horizontal plane of the pivoted limb, an extension on said pivoted limb of the tube holder, normally bearing on the ledge of said stepped disk to be engaged thereby to close the tube holders, a gap in the stepped disk to effect reopening of the tube holders to release the tube and to permit introduction of the freshly filled tube.

4. In a tube closing machine, the combination comprising a plurality of closing mechanisms, a common tube carrier adapted to move intermittently, a pawl and ratchet mechanism effecting the advance movement of said tube carrier, a member connected with said pawl and ratchet mechanism adapted to operate said closing mechanisms upon the retreating movement of said pawl, tube holders formed with two limbs, one limb being fixed to the common carrier and the other limb pivoted thereto, a stepped disk disposed in the horizontal plane of the pivoted limb, an extension on said pivoted limb normally bearing on the edge of said stepped disk to be engaged thereby in order to close the tube holders, said stepped disk having a gap therein to effect the reopening of the tube holders in order to release the tube and to permit introduction of a freshly filled tube, said stepped disk also carrying an arm adjacent to said gap, a pin on the pivoted limb of said tube holders, said arm being adapted to engage said pin the moment it passes said gap to force the extension of said pivoted limb into said gap to open the holders successively, a lever on the stationary machine frame normally out of contact with any part of the tube holders, a spring engaging said lever, an arm fitted to the movable pawl carrier of the pawl and ratchet mechanism adapted on its retreating movement to engage said lever which thereby strikes against said pin or said pivoted lever to withdraw the extension of said limb out of said gap to reclose the opened tube holder whereby the finally closed tube is allowed to drop.

In testimony whereof I have signed my name to this specification.

HUGO OTTO GEORG SCHILLING.